United States Patent Office 3,629,262
Patented Dec. 21, 1971

3,629,262
PROCESS FOR PREPARING 4-PHENYL-QUINAZOLINES
Stanley C. Bell, Penn Valley, and Peter H. L. Wei, Springfield, Pa., assignors to American Home Products Corporation, New York, N.Y.
No Drawing. Continuation-in-part of application Ser. No. 729,838, Feb. 23, 1968, which is a division of application Ser. No. 447,545, Apr. 12, 1965. This application Sept. 5, 1969, Ser. No. 855,734
Int. Cl. C07d 51/48
U.S. Cl. 260—251      4 Claims

ABSTRACT OF THE DISCLOSURE 4-phenylquinazolines are prepared by reacting a 2-aminodiphenylmethyleneiminoacetic acid N-oxide with a reactant selected from the group of lower alkanoyl anhydrides and halo-(lower)alkanoyl anhydrides to form the corresponding 2'-[α-(hydroxymethylimino)benzyl]-(lower)alkanoyl anilide, alkanoate which is then cyclized to form the 4-phenylquinazolines. The products have known pharmaceutical properties which render them useful as muscle relaxants and vasodilators.

---

This application is a continuation-in-part of our copending application, Ser. No. 729,838 filed on Feb. 23, 1968, now abandoned, which is a division of our earlier application, Ser. No. 447,545, filed Apr. 12, 1965, now abandoned.

This invention is directed to substituted o-amino-N-oxymethyl benzophenoneimines, to a process for preparing such compounds and to their conversion to quinazolines.

The claimed compounds exhibit varied central nervous system activity including depressant activity, anticonvulsant activity and analgesic activity, as determined by standard experimental procedures with warmblooded animals. The 4-phenylquinazolines produced by the herein disclosed methods have known utilities. Thus, it is well known in the art that quinazoline derivatives have pharmacological uses; namely, as muscle relaxants noting U.S. Pat. No. 3,215,694 and also as vasodilators (hypotensives), noting U.S. Pat. No. 3,266,990, which is also indicated in French Pat. No. 3207M of Mead Johnson and Company, published Apr. 26, 1965. In addition to the pharmacological uses of quinazolines, German Pat. No. 724,261, dated July 9, 1942, discloses that such compounds are useful when added to emulsions, developers, etc. to stabilize and prevent fogging in photographic work. Additionally, British Pat. No. 943,606, dated Dec. 4, 1963, discloses quinazolines utilized in the field of photoconductive coatings.

The claimed compounds can be represented by the following general formula:

(I) 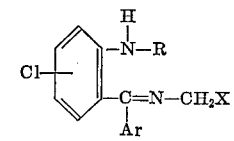

wherein R is acetyl, X is acetoxy or ethoxy; Ar is phenyl.

For the purpose of this invention, it should be noted that equivalent substituents for the chlorine atom in the above formula include, for example, but without limitation, one or more straight chain or branched alkyl groups having from one to five carbon atoms, and such groups as: nitro, cyano, bromo, haloalkyl, particularly trifluoromethyl. Equivalent substituents for the symbol R include acyloxy groups having up to 5 carbon atoms therein.

Similarly, equivalent substituents for the symbol Ar include, for example, but without limitation, halophenyl, nitrophenyl, alkylphenyl and the like wherein the substituents are on either the o-, m- or p-positions on the phenyl ring. Compounds having the above indicated substituents possess substantially the same properties as the preferred compounds specifically claimed herein.

The compounds of this invention are moderately high melting solids which are substantially insoluble in water and generally soluble in organic solvents such as cyclohexane and ethanol. Examination of these compounds reveals upon nuclear magnetic resonance, ultraviolet and infrared spectrographic analyses spectral data confirming the molecular structure hereinbefore set forth. For example the exocyclic C=N frequency characteristic of the compounds is evident. These characteristics taken together with the nature of the starting materials, the mode of synthesis and the reactions of the claimed compounds positively confirm their structure as being that above set forth.

The reactions occurring in the preparation of the claimed compounds are shown below with reference to specific embodiments of the invention:

EQUATION I

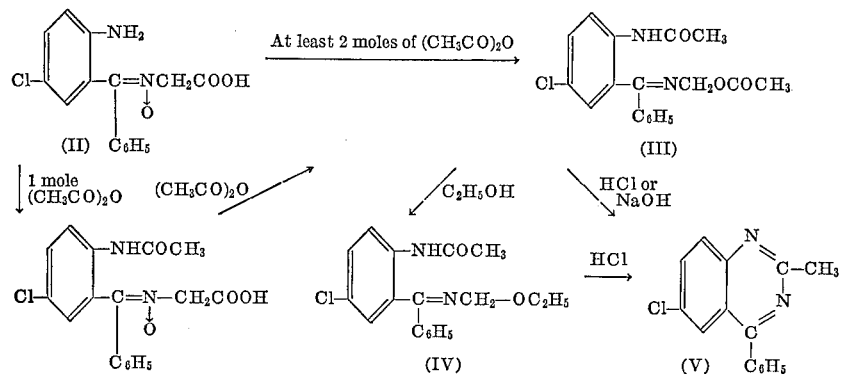

3

As above shown the preparative aspect of the claimed invention comprises reacting 2 - amino-5-chlorodiphenyl-methyleneimino acetic acid N-oxide (II) or an equivalent compound with a lower alkanoyl anhydride or with a halo(lower)alkanoyl anhydride. The named starting material (II) and compounds equivalent thereto are known or can be readily prepared by methods well-known to those skilled in the art.

In the first reaction shown, compound II is heated either without solvent or in an insert solvent such as chloroform with at least 2 moles of acetic anhydride at a temperature of from about 50° C. to the reflux temperature of the solvent mixture. The filtrate from this step is concentrated to give an oily residue which is treated with ether to give the corresponding 4'-chloro-2'-[α-(hydroxymethylimino) benzyl]-acetanilide, acetate (III). Alcoholysis of the latter compound to form an alkanoate by warming with lower alkanol (e.g. ethanol) and recrystallization of the product from cyclohexane yields 4' - chloro-2'-[α-(ethoxymethylimino)benzyl]acetanilide (IV). Treatment of III with a mineral acid (e.g. hydrochloric acid) or an alkali metal base (e.g. sodium hydroxide) or of IV with a mineral acid (e.g. hydrochloric acid) in the cold or with warming, causes cyclization and the formation of 6-chloro-2-methyl-4-phenylquinazoline (V).

It should be noted that Equation I thus represents an advantageous synthesis of a 2-H or a 2-alkyl or haloalkyl- or a 2-aryl-4-phenylquinazoline wherein the precise nature of the substituent in the 2-position is determined by the original selection of the acylating agent reacted in the first step with the N-oxide (II).

The details of the claimed invention are illustrated in the following examples.

Ex. 1.—Preparation of 4'-chloro-2'-[α-(hydroxymethylimino)benzyl]-acetanilide, acetate A mixture of 5.0 g. of 2-amino-5-chlorodiphenylmethyleneimino acetic acid N-oxide and 50 ml. of acetic anhydride was heated on the steam bath with stirring for 30 mins. During this time most of the solid dissolved; there was also observed an evolution of gas. The reaction mixture was cooled, filtered from impurities and concentrated to dryness in vacuo. The residue was treated with a small amount of cold alcohol and the resultant solid was filtered to give 2.3 g. of product, M.P. 123–125° C. Recrystallization from cyclohexane did not change the M.P.

Elemental analysis confirmed the empirical formula:

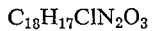

$C_{18}H_{17}ClN_2O_3$

Ex. 2.—Preparation of 4'-chloro-2'-[α-(ethoxymethylimino)benzyl]acetanilide

A solution of 2.3 g. of 4'-chloro-2'-[α-(hydroxymethylimino)benzyl]acetanilide acetate in ethanol was boiled until ½ the ethanol was evaporated and then chilled. The resultant solid, 1.3 g., M.P. 114–116° C., recrystallized from cyclohexane and the product had a M.P. 118–120° C. after drying to constant weight.

Elemental analysis confirmed the empirical formula:

$C_{18}H_{19}ClN_2O_2$

Ex. 3.—Preparation of 6-chloro-2-chloromethyl-4-phenylquinazoline

A chloroform solution of 2 - amino-5-chlorodiphenylmethyleneiminoacetic acid N-oxide and chloroacetic anhydride was stirred at room temperature for 30 minutes. After the solvent was removed the residue was treated with $C_2H_5OH$ to give a product melting at 123–5° C.

Elemental analysis confirmed the empirical formula:

$C_{15}H_{10}Cl_2N_2$

Ex. 4.—Preparation of 6-chloro-4-phenylquinazoline

To a solution of 10 ml. of 98–100% formic acid and 5 ml. of acetic anhydride was added 1.0 g. of 2-amino-5-chlorodiphenylmethyleneiminoacetic acid N-oxide. The solution was stirred at room temperature for 1 hr.; heated at 60° C. for ½ hr., cooled, and diluted with a large volume of water. A sticky precipitate was separated from the aqueous layer and recrystallized from an alcohol-water mixture giving the product melting at 136–138° C.

Elemental analysis confirmed the empirical formula:

$C_{14}H_9ClN_2$

Ex. 5.—Preparation of 6-chloro-2-methyl-4-phenylquinazoline (A) To a suspension of 4'-chloro-2'-[α-(hydroxymethylimino)benzyl] acetanilide, acetate in ethanol was added a sodium hydroxide solution. The resultant solution was diluted with water to give the product, M.P. 105–107° C.

(B) To 2.0 g. of 4'-chloro-2'-[α(hydroxymethylamino)benzyl]acetanilide, acetate was added 15 cc. of 6 N HCl and 30 cc. of ethanol. The solid dissolved and then the product precipitated out as the hydrochloride salt of the compound, M.P. 183–185° C.

(C) To a suspension of 4'-chloro-2'-[α-(ethoxymethylamino)benzyl]acetanilide in alcohol was added an excess of 6 N hydrochloric acid and the resultant clear solution was heated to reflux. After several minutes a solid separated. The reaction mixture was cooled and the precipitate, M.P. 183–185° C., was collected and found to be identical with the product formed by Method B.

These compounds may be administered singly with pharmaceutically acceptable carriers or in admixture with other active compounds. The present invention also includes the process of bringing the compounds thereof into a form suitable for therapeutic administration by associating them with liquid or solid, pharmaceutically acceptable carriers.

Various changes and modifications of this invention can be made by those skilled in the art to which it relates and to the extent that such variations incorporate the spirit of the invention, they are included in the scope of the claims.

What is claimed:

1. Process for making a 4-phenylquinazoline having in the 2-position thereof a substituent selected from the group consisting of hydrogen, lower-alkyl and halo(lower)alkyl, which process comprises reacting at from about 50° C. to reflux temperature of 2-aminodiphenylmethyleneimino acetic acid N-oxide with at least two moles of a reactant selected from the group consisting of lower alkanoyl anhydrides and halo(lower)alkanoyl anhydrides to form the corresponding 2' - [α - (hydroxymethylimino)benzyl] (lower)alkanoyl anilide, alkanoylate which is cyclized by reacting at room temperature with a cyclizing agent selected from the group consisting of a mineral acid and sodium hydroxide to form said 4-phenylquinazoline.

2. The process of claim 1, in which said mineral acid is hydrochloric acid.

3. The process of calim 1, in which said 2'-[α-(hydroxymethylimino)benzyl](lower)alkanoylanilide, alkanoate is cyclized by warming to the boiling temperature with a lower alkanol forming a 2'-[α-(loweralkoxymethylimino)benzyl](lower)alkanoylanilide which is cyclized by heating to the reflux temperature with a mineral acid to form said 4-phenylquinazoline.

4. The process of claim 3, wherein said lower alkanol is ethyl alcohol and said mineral acid is hydrochloric acid.

References Cited

UNITED STATES PATENTS 3,169,129   2/1965   Rodgers et al.  260—251

ALEX MAZEL, Primary Examiner

R. V. RUSH, Assistant Examiner

U.S. Cl. X.R.

260—490, 518 R, 518 A, 562 A, 999